Sept. 16, 1924.  
F. M. CASTLEMAN  
1,508,921  
LOADING AND UNLOADING GEAR FOR HOISTING PLANTS  
Filed March 17, 1920  
4 Sheets-Sheet 1

INVENTOR:  
Frank M. Castleman  
BY  
ATTORNEY

Sept. 16, 1924.  
F. M. CASTLEMAN  
1,508,921  
LOADING AND UNLOADING GEAR FOR HOISTING PLANTS  
Filed March 17, 1920  
4 Sheets-Sheet 2

INVENTOR:  
F. M. Castleman  
BY A. L. Vencill  
His ATTORNEY

Sept. 16, 1924.

F. M. CASTLEMAN 1,508,921

LOADING AND UNLOADING GEAR FOR HOISTING PLANTS

Filed March 17, 1920

INVENTOR:
F. M. Castleman
BY A. L. Vencill
His ATTORNEY

Sept. 16, 1924.
F. M. CASTLEMAN
1,508,921
LOADING AND UNLOADING GEAR FOR HOISTING PLANTS
Filed March 17, 1920
4 Sheets-Sheet 4
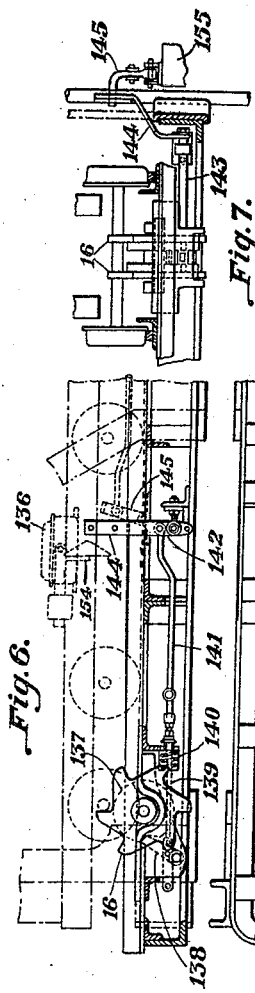
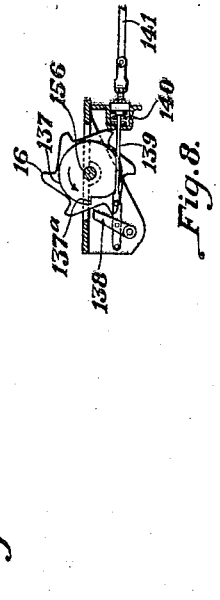
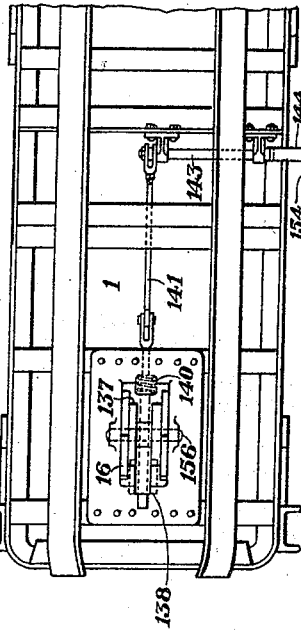
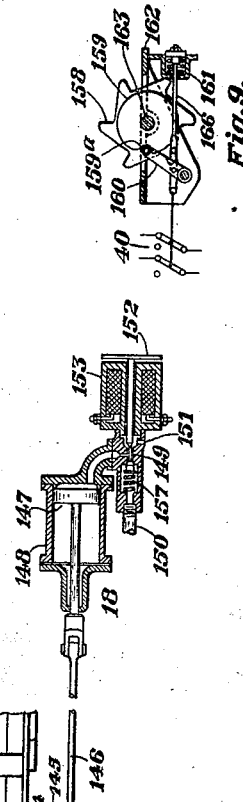
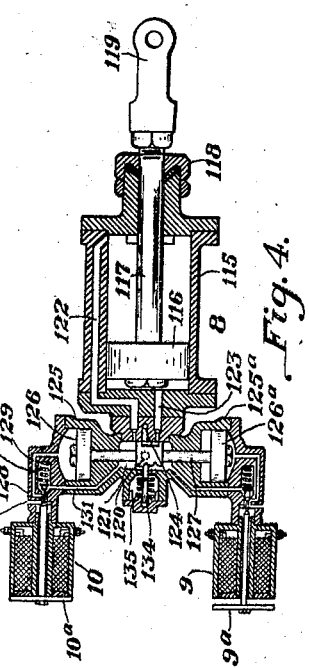
INVENTOR:
Frank M. Castleman
BY
His ATTORNEY Patented Sept. 16, 1924.

1,508,921

UNITED STATES PATENT OFFICE.

FRANK M. CASTLEMAN, OF ROTHERHAM, ENGLAND, ASSIGNOR, BY MESNE ASSIGNMENTS, TO THE UNION SWITCH & SIGNAL COMPANY, OF SWISSVALE, PENNSYLVANIA, A CORPORATION OF PENNSYLVANIA.

LOADING AND UNLOADING GEAR FOR HOISTING PLANTS.

Application filed March 17, 1920. Serial No. 366,714.

*To all whom it may concern:*

Be it known that I, FRANK MASTERS CASTLEMAN, a subject of the King of Great Britain, residing at Rotherham, in the county of Yorkshire, England, have invented a certain new and useful Improvement in Loading and Unloading Gears for Hoisting Plants, of which the following is a specification.

This invention relates to loading and unloading gear for hoisting plant and the like and particularly although not exclusively to decking plant as employed in collieries and other mines of the kind comprising a hoisting cage having one or more decks and arrangements for loading and unloading empty and full tubs or trucks on to and from the cage respectively.

The invention has for its object to provide improved arrangements and apparatus for effecting the transfer of the tubs or trucks to and from the hoisting cage which shall be efficient and to a greater or less extent, as desired, automatic in operation while ensuring a higher degree of safety in working than has hitherto been possible.

The invention contemplates the provision of one or more power-operated rams for driving empty tubs or trucks on to the hoisting cage when the latter is in its proper position, thereby displacing the full tubs from the cage on to a tub hoist, track or other arrangement adapted to receive them.

According to the principal feature of the invention the control mechanism for the power-operated rams is arranged to be electrically interlocked with mechanism for securing the hoisting cage in position during the loading and unloading operation, thereby enabling the latter to be carried out with absolute security and at the same time obviating unnecessary delay.

Further features of the invention relate to arrangements for causing an automatic return motion of the ram mechanism after placing the empty tubs in position upon the hoisting cage, and a general system of electric interlocking and indication circuits whereby absolute security against improper operation of any part of the gear may be obtained.

The invention is illustrated diagrammatically in the accompanying drawings as applied to the decking plant for a colliery or the like, Figure 1 being a view in elevation of the decking plant embodying the invention and showing the general arrangement of the pit head mechanism with the hoisting cage in position for unloading.

Figure 1:
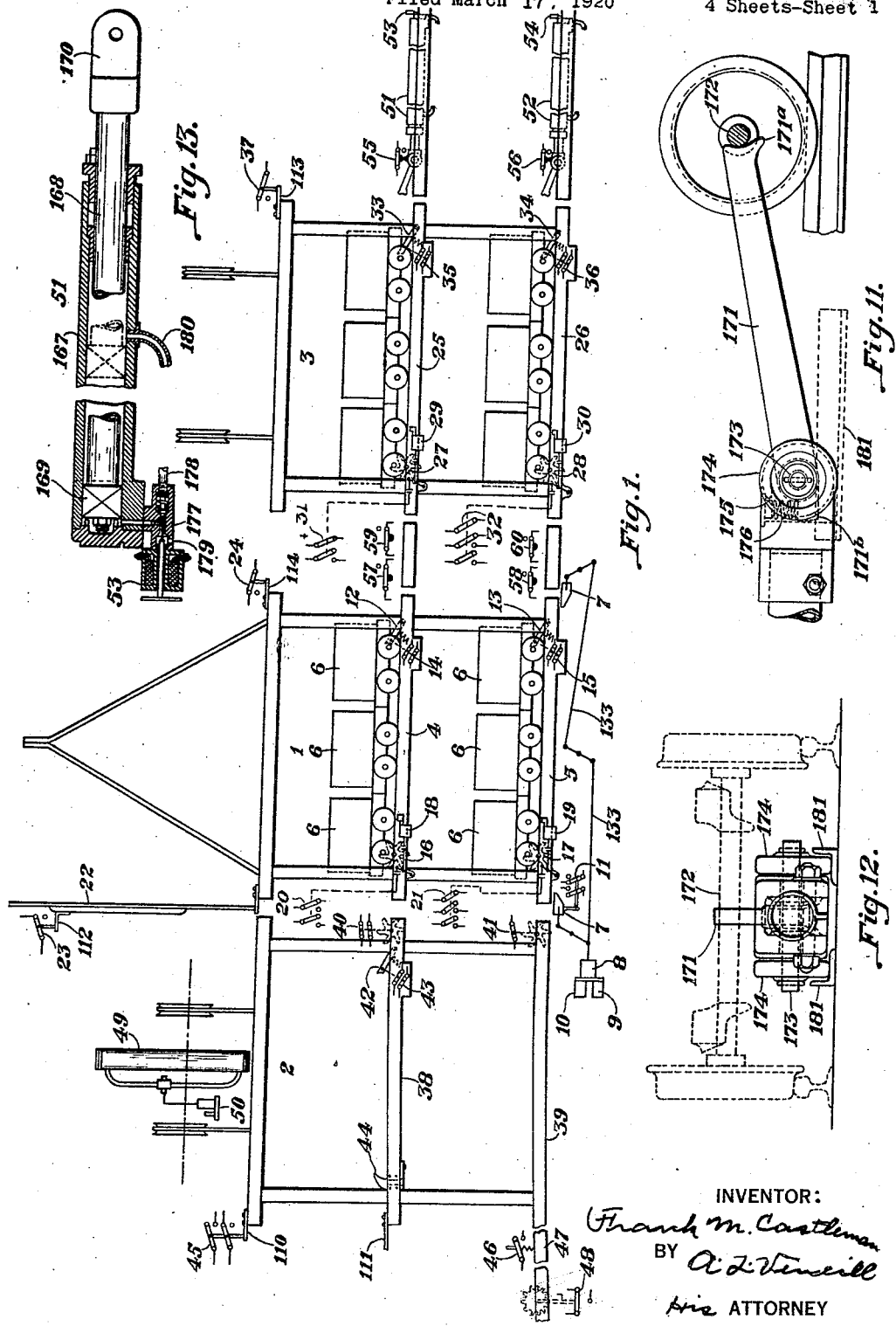
Figure 2:
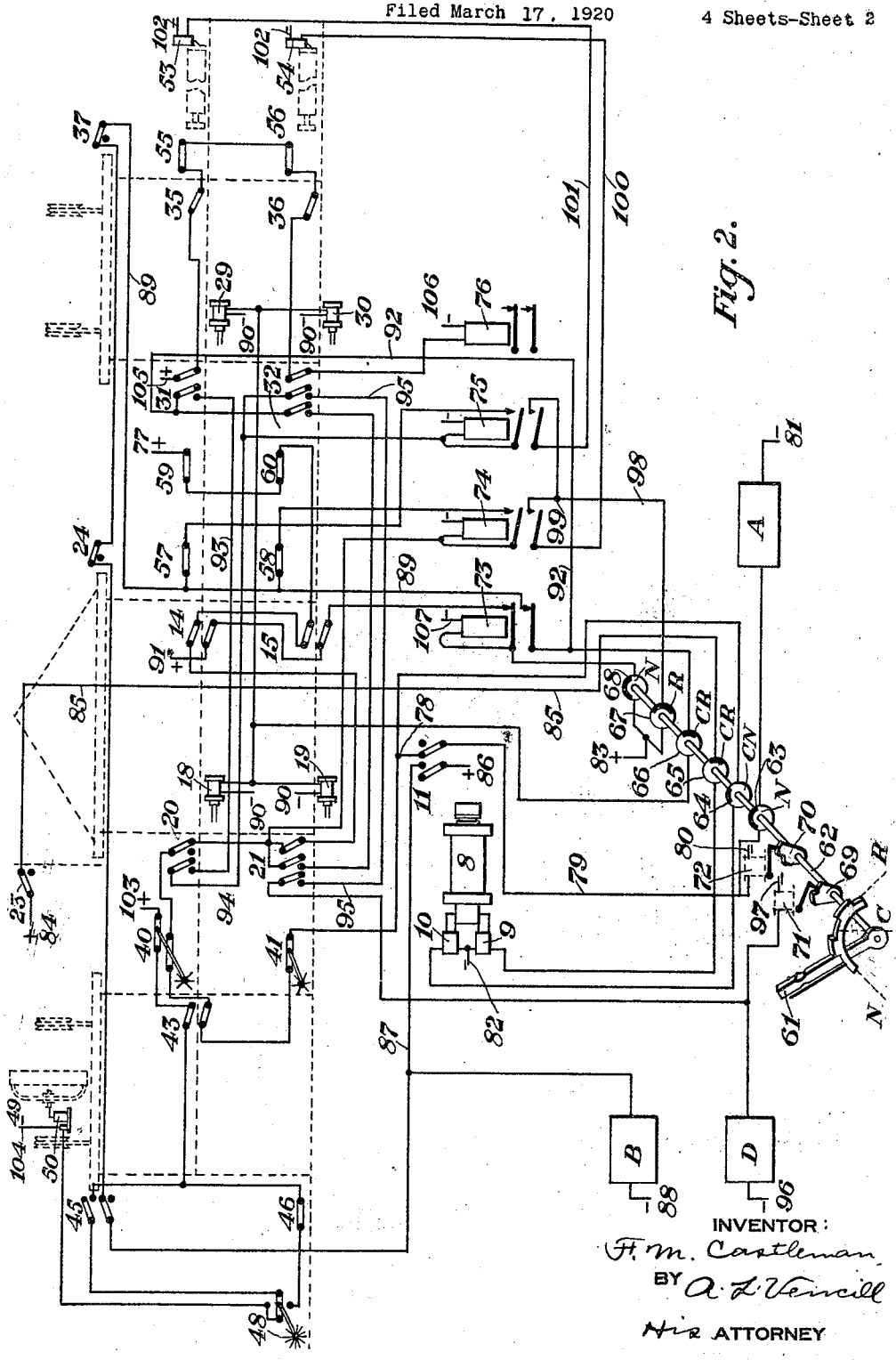
Figure 2 is a circuit diagram showing the electrical connections and interlocking circuits employed in the installation of Figure 1.

Fig. 4 is a sectional view showing the kep motor 8 and operating magnets 9 and 10 illustrated in outline in Figs. 1 and 2.

Fig. 5 is a plan view showing one form of automatic axle counter and unlocking motor mechanism associated therewith. Fig. 6 is a side elevation, and Fig. 7 an end elevation, of the apparatus shown in Fig. 5, while Fig. 8 is a detail of one of the parts of said apparatus.

Fig. 9 is a view showing an axle counter forming part of the plant illustrated in Figs. 1 and 2.

Fig. 10 is a view showing a modified form of axle counter also constituting part of the plant illustrated in Figs. 1 and 2.

Fig. 11 is a view showing in side elevation the head of a ram 51 forming part of the plant illustrated in Figs. 1 and 2. Fig. 12 is an end view of the ram 51, and Fig. 13 is a sectional view of the motor mechanism of this ram.

Similar reference characters refer to similar parts in each of the several views.

Referring now first to Figure 1, the hoisting cage is indicated diagrammatically at 1 as of the center double deck type, a full tub hoist indicated at 2 being shown as located on one side of the cage 1 and an empty tub hoist 3 on the other side. The upper and lower decks 4 and 5 respectively of the hoisting cage 1 are each shown as containing three tubs or trucks 6 which have been raised to the pit head by means of the cage 1 which is operated by the usual hoisting mechanism. In order to lock or secure the hoisting cage in the position shown a number of "keps" indicated at 7 are provided which are arranged to be placed in position under the cage 1 and withdrawn there-from by means of a pneumatically operated kep motor 8 having forward and reverse electro-magnetically operated actuating valves 9 and 10 respectively. The structure of the kep motor is illustrated in Fig. 4 and is described hereinafter. The keps 7 are provided with corresponding forward and reverse indication contacts 11 one or other of which is closed according to whether the keps are in their operative or inoperative position.

On the entrance side of the cage 1, namely the right hand side as shown in Figure 1, each of the decks 4, 5 is provided with an automatic back stop 12, 13 comprising a pivoted arm over which the axles of the tubs can freely pass but which prevents their movement in the reverse direction. The back stops 12, 13 are each provided with an indication contact device 14, 15 respectively each comprising a pair of switches adapted to be automatically closed when the back stop is in its normal or operative position to prevent movement of the tubs in a reverse direction.

The decks 4, 5 of the cage on the exit side, that is to say the left hand side of Figure 1, are each provided with an automatic axle counter or stop 16, 17 respectively for locking tubs in the cage. The construction of these axle counters is such that after a definite number of axles and therefore of tubs have passed the counter, the latter is locked automatically and prevents the further passage of tubs over the counter until the latter is again unlocked by a motor mechanism indicated diagrammatically at 18, 19. One form of axle counter and unlocking motor mechanism is illustrated in Figs. 5, 6, 7 and 8 and is described hereinafter. The counter unlocking devices 18, 19 are provided with indication contacts shown diagrammatically at 20, 21 respectively each comprising a number of switches adapted to complete or disconnect electric indication circuits as will be hereinafter described.

It should be observed that the axle counters or stops 16, 17 are mounted upon the hoisting cage 1 itself, whereas the motor mechanisms 18, 19 for unlocking these axle counters are mounted upon the stationary portion of the pit head mechanism so that the electric conductors for the control magnets of the motor mechanisms are fixed and are not attached to the hoisting cage.

At the pit head on the exit side of the hoisting cage 1 a gate 22 is provided adapted to be automatically raised by the cage 1 as the latter rises to the surface. The gate 22 is provided with an indication contact device 23 adapted to be closed only when the gate is fully lifted. This contact device is operated by a stem 112 attached to the gate. The hoisting cage itself is also provided with an indication contact device 24 adapted to be closed only when the cage is at the proper level for unloading, this contact being operated by a stem 114 attached to the cage.

The empty tub hoist indicated at 3 is also of the double deck type and comprises two decks 25 and 26 corresponding to the decks 4, 5 respectively of the hoisting cage 1.

The tub hoist 3 is provided on its exit side with axle counters or stops 27, 28 and electrically controlled unlocking motors therefor indicated at 29, 30 together with indication contacts 31, 32 all of these devices being similar to those above referred to as provided for the hoisting cage 1.

The entrance side of the empty tub hoist 3 is provided with automatic back stops 33, 34 similar in construction to those illustrated at 12, 13 on the hoisting cage, each of these back stops being provided with a indication contact 35, 36 respectively.

The hoist 3 is also provided with an indication contact 37 adapted to be closed only when the hoist 3 is in the position shown in Figure 1 with its decks 25, 26 in proper alignment with the decks 4, 5 of the hoisting cage 1. This contact is operated by a stem 113 attached to the cage.

The empty tub hoist 3 is arranged to be raised and lowered into and from the position shown in the drawing by means of suitable mechanism, not shown, for the purpose of placing empty tubs or trucks in position on the decks of the hoist.

Referring now to the full tub hoist indicated at 2, this is generally similar in mechanical construction and arrangement to the empty tub hoist 3 being provided with two decks indicated at 38, 39 respectively, each capable of accommodating three tubs or trucks. Adjacent to the entrance side of the hoist 2 an automatic axle counter is provided for each deck of the hoist, the axle counters for the decks 38, 39 being indicated at 40, 41 respectively. Each of the axle counters 40, 41 is so constructed that when six axles corresponding to three tubs have passed over the counter one or more indication contacts are closed as indicated diagrammatically in Figure 2 of the drawings. One form of counter suitable for this purpose is illustrated in Fig. 9 and is described hereinafter.

The upper deck 38 of the hoist 2 is provided with an automatic back stop 42 similar to the back stops 12, 13 and provided with indication contacts 43 similar to those indicated at 14 and 15. This deck of the hoist is also provided with a manually operable axle stop 44. The hoist 2 is furthermore provided with an indication contact 45 which is arranged to be closed only when the hoist 2 is in its proper position as shown in the drawing, a second indication contact 46 being arranged to be closed when the upper deck 38 of the hoist is on the level of this latter indication contact. Contact 45 is operated by a stem 110, and contact 46 by a stem 111, both of which are attached to the hoist 2 in suitable positions.

On the side of the full tub hoist 2 remote from the hoisting cage 1 a track indicated at 47 is provided for the reception of the tubs leaving the tub hoist 2 an automatic axle counter indicated at 48 being provided as shown. The axle counter 48 is similar in construction to those indicated at 40, 41 except that it is arranged to close one pair of switch contacts when six axles have passed over the counter and to close another pair of contacts when a further six axles have passed. One form of counter suitable for this purpose is illustrated in Fig. 10 and described hereinafter. The hoist 2 is arranged to be lowered from the position shown in Figure 1 to a position in which the upper deck 38 is on the same level as the track 47 for the purpose of discharging the tubs carried by the deck 38 and this movement of the hoist is arranged to be effected by mechanism illustrated diagrammatically at 49 comprising a pneumatic or other fluid pressure device controlled by an electro-magnetically operated valve indicated at 50.

On the right hand side of the empty tub hoist 3 two power-actuated rams 51 and 52 are provided, one for each deck of the hoisting cage and hoists, the operation of the rams 51, 52 being controlled by electro-magnetically actuated valves 53, 54 respectively. The structures of these rams are illustrated in Figs. 11, 12 and 13, and are described hereinafter. Indication contacts 55, 56 are provided which are adapted to be closed only when the rams are in their inoperative or fully retracted position as shown in Figure 1.

Located intermediate the hoisting cage 1 and the empty tub hoist 3 are a pair of indication contacts 57, 58 adapted to be operated by the rams 51, 52 when the latter reach their forward position as will be hereinafter described. A second pair of indication contacts 59, 60 are also provided adapted to be closed only when the ram heads are clear of the hoisting cage 1 during the return movement of the rams 51, 52.

Referring now to Fig. 4, the kep motor 8 comprises a cylinder 115 containing a piston 116, to which is attached a rod 117 passing out through a packing gland 118, and terminating in a yoke 119 which is attached to the kep operating links and cranks 133, shown in Fig. 1. Fluid pressure is admitted to one end of the cylinder 115 through a port 123 and to the other end of this cylinder through a port 122, the connection of these ports with the source of fluid pressure and with atmosphere being controlled by a slide valve 120 operating in a chamber 121 which is constantly connected with a source of fluid pressure not shown in the drawing. When the valve 120 occupies the position in which it is shown, port 123 is connected with atmosphere through an exhaust port 124, whereas port 122 is connected with fluid pressure so that piston 116 is at the left-hand end of the stroke. In this position the keps 7 are in locking positions, as shown in Fig. 1. When the slide valve 120 is reversed, port 122 will be connected with atmosphere and port 123 will be supplied with fluid pressure, so that piston 116 will be moved to the right and so will withdraw the keps from their locking positions.

The slide valve 120 is controlled by a piston 126 operating in a cylinder 125 and also by a piston $126^a$ operating in a cylinder $125^a$. These two pistons are rigidly connected by a rod 127 and the slide valve 120 is attached to this rod. The supply of fluid pressure to the outer end of cylinder 125 is controlled by a pin valve 128, which, in turn, is controlled by an armature $10^a$ operated by an electromagnet 10. When the magnet 10 is energized, the valve 128 is in the position shown in the drawing, so that the outer end of cylinder 125 is connected through port 129 and 131 with the valve chamber 121, and so is supplied with fluid pressure. When magnet 10 becomes de-energized valve 128 will be reversed by means of spring 132, so that the port 129 leading to cylinder 125 will be disconnected from the valve chamber 121 and will be opened to atmosphere through port 130.

The outer end of cylinder $125^a$ is controlled by a valve $128^a$, which, in turn, is actuated by armature $9^a$ of electromagnet 9, these parts being similar to the parts associated with cylinder 125.

As shown in the drawing, magnet 10 is energized and magnet 9 is de-energized, so that cylinder 125 is connected with fluid pressure and cylinder $125^a$ is opened to atmosphere. Pistons 126 and $126^a$ are, therefore, in such positions that the keps are in locking positions. When it is desired to unlock the cage 1, magnet 9 will be energized and magnet 10 will be de-energized, so that the pistons 126 and $126^a$ will be moved upwardly, as shown in Fig. 4, whereupon slide valve 120 will be reversed to reverse the position of piston 116 in the cylinder 115.

In order to lock the slide valve 120 in its extreme positions, the back of this valve is provided with notches co-operating with a plunger 134 which is pressed inwardly toward the slide valve by a spring 135.

Referring now to Figs. 5, 6, 7 and 8, the automatic axle counter 16 comprises two star wheels fixed to a shaft 156 and each having six arms positioned for engagement with the axles of the tubs 6. Each axle rotates these star wheels through one-sixth of a revolution, so that three tubs will cause a complete revolution of the wheels. The inner side of each star wheel 16 is provided with a hub 137 having a notch or recess 137ª as best shown in Fig. 8, and co-operating with this notch is a dog 138 which is attached to a rod 139 and is biased by a spring 140 to such position that the dog enters notch 137ª when the two are in register. It follows from this that after the dog 138 has been released, three tubs may pass the counter without being impeded, but that after the sixth axle passes this counter the dog 138 will be drawn into the notch 137ª by the spring 140, so that the passage of further tubs will be prevented.

The rod 139 is connected with a second rod 141 which is attached to a crank 142 on a transverse rod 143. The outer end of this latter rod carries a crank 144 which is bent, as shown in Fig. 7, to bring the free end in the path of a bent crank 145 pivotally mounted on the stationary portion 155 of the pit head mechanism. Pivotally attached to the crank 145 is a rod 146, which, in turn, is connected with a piston 147 operating in a cylinder 148 of the unlocking motor mechanism 18. The outer end of cylinder 148 is connected with atmosphere through a port 151 or with a source of fluid pressure 150, depending upon the position of a pin valve 149 which is actuated by an armature 152 of an electromagnet 153. When this magnet is de-energized the pin valve occupies the position in which it is shown due to the influence of a spring 157, so that cylinder 147 is then connected with atmosphere through port 151. When magnet 153 becomes energized, pin valve 149 is reversed so that cylinder 148 is disconnected from atmosphere and is connected with the fluid pressure pipe 150, so that this piston and the rod 46 are then moved to the left, as viewed in Fig. 5. This causes crank 145 to engage with crank 144, thereby rocking the shaft 143 in such direction as to move rods 141 and 139 to the left, thereby moving the dog 138 out of the notch 137ª and so releasing the star wheels of the counter 16. After one axle has passed this counter magnet 153 may be de-energized, but the dog 138 will not interfere with the passage of subsequent axles until three tubs have passed over the counter.

The contacts 20 or 21, shown in Fig. 1, are contained in a box 136 and are actuated by a crank 154 which is shifted by the upper end of crank 144 when the motor 18 is operated to release the counter. Contacts 20 and 21 are in the position illustrated in Figs. 1, 2 and 3 only when the counter is locked. At all other times these contacts are reversed.

As best shown in Figs. 5 and 7, the axle counter 16 is mounted upon the hoisting cage 1, whereas the motor mechanism 18 and the circuit controller box 136 are mounted upon the stationary portion 155 of the pithead mechanism, so that the electrical conductors for the control of the motor and for the contacts 20 and 21 are not attached to the cage.

Referring now to Fig. 9, the automatic axle counter 40 comprises a star wheel 158 fixed to a shaft 163 which is mounted to rotate in a suitable frame 162. The star wheel 158 is provided with six arms each positioned for engagement with the axles of the tubs 6, so that this star wheel makes one complete revolution for each three tubs. Fixed to the star wheel 158 is a circular cam 159 having a recess 159ª at one point in its periphery. Pivotally mounted in the frame 162 is a dog 160 having a roller co-operating with the surface of the cam 159. A rod 161 is pivotally connected with the dog 160, and this rod and dog are biased to the right as viewed in Fig. 9 by a spring 161 so that when the recess 159ª registers with the roller on the dog 160 this dog will fall into the recess as shown in the drawing. The indication contacts 40 are operatively connected with the dog 160 so that these contacts are in one position after six axles have passed and are in the other position until six more axles have passed.

Referring now to Fig. 10, the automatic axle counter 48 is similar to the counter shown in Fig. 9, with the following exceptions: The star wheel which is designated 164 in Fig. 10 is provided with 12 arms, so that this wheel makes a complete revolution for six tubs. The cam which is here designated 165 comprises two sections, each of which is semi-circular in configuration, the radius of one section being greater than the radius of the other section. It follows that during one half of the revolution of the star wheel, that is, during the passage of three tubs, the dog 160 will occupy one position and during the passage of the next three tubs this dog will occupy another position, the result being that contact 48 will be reversed after the passage of each three tubs.

Referring now to Figs. 11, 12 and 13, the power actuated ram 51 comprises a cylinder 167 containing a plunger 168 provided with a piston 169. The outer end of plunger 168 is provided with a crosshead 170, in which is journaled a shaft 173 carrying two wheels 174 which roll on suitable guides 181 located in the trackway. Pivotally mounted on the shaft 173 is a driving arm 171, the free end of which is provided with a concave face 171ª adapted for co-operation with the tub axles 172. The driving arm 171 is biased by a spring 176 to such position that it will engage with the axles 172, this spring being seated in the crosshead 170 and coacting with a shoulder 171$^b$ on the driving arm 171. Upward movement of the arm 171 is limited by a stop 175 in the crosshead 170. The cylinder 167 is so located in the trackway that it will be cleared by the tub axles, and it will be obvious that each axle passing over the ram will depress the arm 171 so that this arm will not interfere with the passage of the tubs.

As shown in Fig. 13, a port 180 enters the cylinder 167 at a point to the right of the extreme outward position of the piston 169. This port 180 leads to a source of fluid pressure so that the supply of pressure at this point in the cylinder is constant. The left-hand end of cylinder 167 is connected with fluid pressure through a pipe 178 or with atmosphere through a port 179, depending upon the position of the pin valve 177 which is controlled by the armature of a magnet 53, these parts being similar to the parts associated with motor 18, shown in Fig. 5, and explained hereinbefore.

When magnet 53 is de-energized, the left-hand end of cylinder 167 is connected with atmosphere and piston 169 is then driven to the left due to the action of the fluid pressure admitted to the cylinder through the port 180. When magnet 53 becomes energized, however, fluid pressure is admitted to the left-hand end of cylinder 167, whereupon the piston 169 and rod 168 are shifted to the right owing to the fact that the entire left-hand face of piston 169 is exposed to fluid pressures whereas the effective area of the right-hand face of this piston is considerably reduced because of the presence of the rod 168.

The power actuated ram, illustrated in Figs. 11, 12 and 13 and just described, is disclosed and claimed in my United States Patent No. 1,407,253, granted Feb. 21, 1922, for power operated rams.

Referring now to Figure 2 of the drawings, it will be seen that in addition to the electro-magnetic valve actuated mechanism and indication contacts already described, the electrical portion of the apparatus comprises a manually operated control lever 61 adapted to occupy one or other of three different positions, indicated at "N", "C", "R". The lever 61 is operatively connected to a shaft 62 carrying a number of switch elements 63, 64, 65, 66, 67 and 68 and two interlocking members 69 and 70 provided with release magnet 71, 72 respectively. The switch elements are utilized, as will appear hereinafter, to control the various elements shown in Fig. 2 and referred to collectively in certain of the appended claims as "cage governing means."

The construction of the switch elements 63 to 68 inclusive is such that the switch 64 is closed when the lever 61 is either in its "N" position or in its "C" position. The switches 65 and 66 are closed when the lever 61 is in its "C" position or in its "R" position. The switch 67 is closed when the lever 61 is in its "R" position only and the switches 63 and 68 are closed only when the lever 61 is in its "N" position.

The locking devices indicated at 69 and 70 are so constructed that the former will prevent the lever 61 from being moved from the "C" position to the "R" position until the magnet 71 is energized. The locking device 70 is similarly arranged to prevent movement of the lever 61 from its "C" position to its "N" position until the corresponding magnet 72 is energized.

The electric interlocking system also includes a number of relays indicated at 73, 74, 75, and 76 the armatures of these relays controlling a number of electrical circuits as will be hereinafter described with reference to this figure of the drawing.

Electrically actuated indicators A, B, and D are also provided for the purpose of notifying the operator that certain conditions of the various elements are obtained.

The general method of operation of the decking plant above described is as follows: The hoisting cage 1 is raised to the surface carrying with it six tubs or trucks three on each deck of the cage. As the cage rises towards its final position the gate 22 is lifted and the cage is eventually locked in the unloading position by means of the keps 7. The empty tub hoist 3 has previously been placed in position and contains six empty tubs or trucks three on each deck ready for transfer to the hoisting cage 1. The full tub hoist 2 is also in the position shown in Figure 1 ready to receive the full tubs from the hoisting cage 1.

Assuming that the hoisting cage 1 and the empty and full hoists 3, 2 are in proper position, the axle stops or counters 18, 19, 27, 28 are unlocked and the rams 51, 52 are started into operation and drive the empty tubs contained in the hoist 3 into the hoisting cage 1 thereby displacing the full tubs contained in the cage 1 which are driven on to the two decks of the full tub hoist 2. The cage 1 is now free to descend and the empty tub hoist 3 is supplied with a new set of empty tubs in any preferred manner. The tubs contained on the lower deck 39 of the full tub hoist 2 pass out of the hoist under the action of gravity and travel along the track 47 (the decks 38, 39 and the track 47 being suitably inclined to the horizontal), and the hoist 2 is subsequently lowered until the upper deck 38 is level with the track 47 whereupon the full tubs contained on the upper deck of the hoist 2 can also pass out along the track 47. The rams 51 and 52 after completing their forward movement to transfer the empty tubs from the hoist 3 to the cage 1 automatically return ready for the next charging operation.

Figure 3:
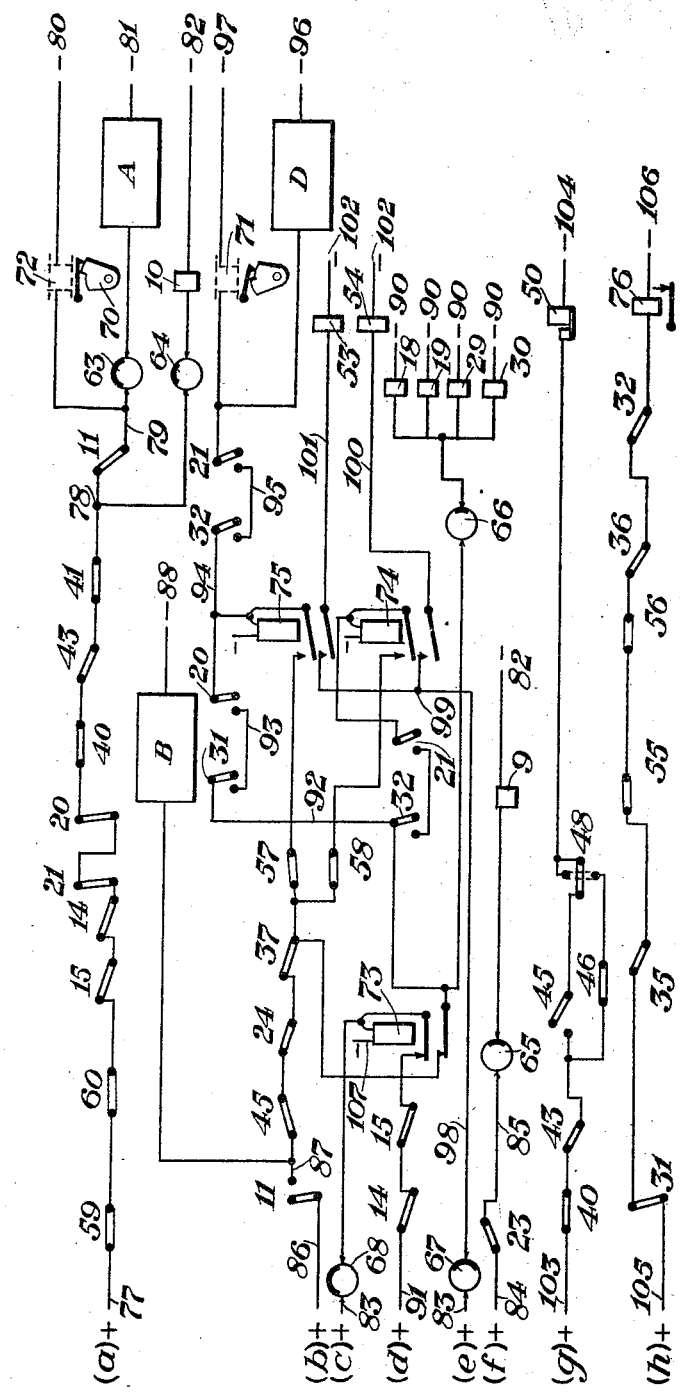
Figure 3 is a simplified diagram of these circuits which will be hereinafter referred to in the description.

The various electrical circuits involved during the operation above referred to will now be described in detail with reference to Figures 2 and 3 of the drawings, Figure 2 showing the complete system of electric conductors and switches employed and Figure 3 showing in simplified form the circuits completed at each stage of the operation.

Assuming that one complete cycle of operations has been performed, the hoisting cage 1 containing the empty tubs is ready for lowering into the pit and the tub hoists 2 and 3 are in the positions shown in Figure 1. The control lever 61 is assumed to be in its "N" position and the following circuits are completed: a circuit indicated at (a) in Figure 3 from the positive terminal 77 through indication contacts 59 and 60, upper indication switch 15, upper indication switch 14, right hand indication switch 21, right hand indication switch 20, the switch of axle counter 40, lower indication switch 43, the switch of axle counter 41 to the point 78. At this point the circuit branches into two parallel circuits, viz, one through right hand indication switch 11, conductor 79 locking magnet 72 to negative terminal 80, a branch circuit being completed from conductor 79 through control switch 63 and indicator A to the negative terminal 81. The other parallel circuit from the point 78 is through control switch 64 and valve actuating magnet 10 of the kep motor 8 to the negative terminal 82. The completion of this circuit causes the indicator A to give the indication "all clear to lower," this indication being only given if the various indication contacts above described are closed as will only be the case if the hoisting cage 1 is in its proper position, the axle counters locked, the keps withdrawn from under the cage and the rams 51 and 52 in their fully retracted position. Another circuit indicated at (c) in Figure 3 is also completed from the positive terminal 83 through the control switch 68 relay winding 73 to the negative terminal 107. The relay 73 being thus energized its two armatures are held in their closed position. The hoisting cage 1 can now be lowered and refilled at the bottom of the shaft with full tubs or trucks which are subsequently raised to the surface. When the hoisting cage 1 has reached the surface, lifted the gate 22 and closed the indication contact 23, the control lever 61 may be moved to its "C" position with the result that the following circuit (indicated at (f) in Figure 3) is completed: from the positive terminal 84 through indication contact 23, conductor 85 control switch 65, actuating magnet 9 of the kep motor 8 to the negative terminal 82. Fluid under pressure is thereby admitted to the kep motor 8 to cause the latter to place the keps 7 under the cage 1 and when this movement of the keps is completed closing the left hand indication contact 11 an indication circuit (shown diagrammatically at (b) in Figure 3) is completed as follows: from the positive terminal 86, left hand indication switch 11, conductor 87, indicator B to negative terminal 88. The indicator B thereupon gives the indication "keps under cage."

A further circuit is also completed from conductor 87 through lower indication switch 45 indication switches 24 and 37 conductor 89 lower armature of the relay 73, control switch 66 and through the actuating magnets of the four axle counter unlocking motors 18, 19, 29, 30 for the axle counters 16, 17, 27, 28 respectively to the negative terminals 90.

It will be observed that the original energizing circuit (c) for the relay 73 through the control switch 68 is broken at this switch when the lever 61 is moved into its "C" position. A maintaining circuit for the relay is however provided (indicated at (d) in Figure 3) from positive terminal 91 through lower indication switches 14, 15 the upper armature of relay 73, the winding of the relay to negative terminal 107. The relay 73 is thus maintained energized so long as indication contacts 14, 15 are closed. When the axle counters 16, 17, 27, 28 have been properly unlocked the corresponding indication contacts 20, 21, 31, 32 are closed and a branch circuit from the lower armature of the relay 73 is completed through conductor 92, left hand indication switch 31 conductor 93, left hand indication switch 20, conductor 94, middle indication switch 32, conductor 95, left hand indication switch 21, the actuating magnet of the indicator D to the negative terminal 96 and through the unlocking magnet 71 to the negative terminal 97. The indicator D now gives the indication "ready to ram" and the unlocking magnet 71 being energized the control lever 61 is free to be moved to its "R" position in which the following circuit indicated at (e) in Figure 3 is completed: from the positive terminal 83 through the control switch 67, conductor 98 to the point 99 where the circuit branches through the lower armatures of the relays 74, 75 to conductors 100, 101 leading through the valve actuating magnets 53, 54 respectively to negative terminal 102. The control electromagnets 53, 54 of the rams 51, 52 being thus energized the rams are operated and move forward to drive the tubs contained on the two decks of the empty tub hoist 3 on to the corresponding decks of the hoisting cage 1 thereby displacing the full tubs 6 from the hoisting cage and causing these to pass into the full tub hoist 2.

As the rams 51, 52 move forward the indication contacts 55, 56 are opened and when the heads of the rams reach indication contacts 57, 58 these contacts are also opened with the result that the circuits through which the relays 74, 75 are energized are broken and the armatures of these relays therefore move into their open position in which the circuit (e) through the actuating magnets 53, 54 of the rams is interrupted at the lower armatures of the relays 74, 75. It will be understood that the circuits originally energizing the relays 74, 75 through the indication contacts 31, 20 and 32, 21 have already been interrupted by the unlocking of the corresponding axle counters 27, 16, 28, 17 with the result that when the circuits through the indication contacts 57, 58 are interrupted by the passage of the ram heads, the relays 74, 75 will permit their armatures to fall and thereby de-energize the actuating magnets 53, 54 or the rams 51, 52 which consequently return automatically to their retracted position.

The passage of the axles of the tubs over the indication contacts 14, 15 has caused circuit (d) to be interrupted by the opening of these indication contacts, with the result that the relay 73 is de-energized and its armatures move to their open position.

As soon as the total number of tub axles has passed over the axle counters the counters 40, 41 re-establish the indication circuits which were interrupted during the passage of the tubs and the axle counters 16, 17, 27, 28 are again locked automatically.

The control lever 61 may now be moved to its "C" position in which circuit (a) through control switch 64 and valve actuating magnet 10 of the kep motor 8 is completed. It should be pointed out that in addition to closing of control switch 64 by lever 61 in its "C" position, the kep motor can be actuated over circuit (a) only if the hoisting cage 1 is in its proper position, the axle counters locked, the back stops 12 and 13 in their normal positions, and the rams 51 and 52 withdrawn clear of the cage.

The kep motor 8 is thereupon operated and withdraws the keps 7 from underneath the hoisting cage 1. As soon as the keps are fully withdrawn right hand indication contact 11 is closed and the branch of circuit (a) including the locking magnet 72 is completed, this magnet being energized and releasing the locking device 70, which permits the control lever 61 to be returned to its "N" position in which the branch circuit (a) through the indicator "A" and circuit (c) are again completed as above described and the signal indication "all clear to lower" is given.

The circuits indicated at (g) and (h) in Figure 3 controlling the full tub hoist 2 and the empty tub hoist 3 respectively operate as follows:—

The axle counter 40 will be in its normal or closed position after the three tubs from the upper deck 4 of the hoisting cage 1 have passed over the axle counter 40 and the back stop 42, the indication contact 43 being reclosed after the last axle has passed.

The axle counter 48 will also be in one of its two closed positions (shown in dotted lines in Figure 3) after the six axles of the tubs on the lower deck 39 have passed out along the track 47 and over the counter 48.

The indication contact 46 being in its closed position owing to the hoist 2 being in its upper position the circuit (g) will be completed from the positive terminal 103 through indication contacts 40, 43, 46 axle counter switch 48, the valve actuating magnet 50 of the fluid pressure device 49 to the negative terminal 104. The device 49 is thereby started into operation and permits the hoist 2 to descend until the upper deck 38 of the hoist is level with the track 47, whereupon the indication contact 46 is opened and the circuit (g) interrupted.

The three tubs on the upper deck 38 of the hoist then pass out of the hoist on to the track 47 and when all six axles have passed the axle counter 48 attains the position shown in full lines in Figure 3. The hoist 2 being relieved of the weight of the three tubs on the deck 38 rises under the action of balance weight mechanism or its equivalent to the position shown in Figure 1, but the circuit (g) still remains interrupted at the axle counter contact 48 although the contact 45 is reclosed when the hoist 2 attains its upper position.

Referring now to the control circuit (h) for the empty tub hoist 3, it will be evident that this circuit is completed from the positive terminal 105 through indication contacts 31, 35, 55, 56, 36, 32, the relay winding 76 to the negative terminal 106. The indication contacts above referred to are closed only when the rams 51, 52 are fully retracted not only from the hoisting cage 1 but also from the hoist 3, and are at rest in their inoperative position. When this is the case the relay 76 is energized and closes control circuits for the operation of the hoist 3 which may be of any suitable character and need not be described or illustrated.

It will be understood that the invention in its broader aspect is not limited to the arrangements or connections above described which merely constitute one form of installation embodying the invention. In other embodiments thereof a greater or less degree of automatic operation may be provided for instead of the manually controlled operation herein shown and described. Modifications in these and other respects may obviously be made without exceeding the scope of the invention.

Having now described my invention, what I claim as new and desire to secure by Letters Patent is:—

1. A colliery decking plant comprising a hoisting cage, indication means for giving a cage-lowering signal, a back stop in said cage having operative and inoperative positions, and means for preventing said indication means from giving said signal unless said stop is in the operative position.

2. A colliery decking plant comprising a hoisting cage, a back stop on said cage for preventing tubs from moving out of the cage backwardly, and indication means controlled by said back stop.

3. A colliery decking plant comprising a hoisting cage, indication means for giving a cage-lowering signal, an axle counter operated by tubs passing out of said cage, and means for preventing said indication means from giving said signal until a given number of tubs have left the cage.

4. A colliery decking plant comprising a hoisting cage, an axle counter operated by tubs passing out of said cage, and indication means controlled by said counter.

5. A colliery decking plant comprising a hoisting cage, indication means for giving a cage-lowering signal, a ram on the plant deck for moving tubs in said cage, and means for preventing said indication means from giving said signal unless the ram is clear of the cage.

6. A colliery decking plant comprising a hoisting cage, indication means for giving a cage-lowering signal, an axle counting device operated by tubs passing out of said cage and arranged to lock after a given number of tubs have passed and thereby prevent the passage of more tubs, and means for preventing said indication means from giving said signal unless said counting device is locked.

7. A colliery decking plant comprising a hoisting cage, an axle counting device operated by tubs passing out of said cage and arranged to lock after a given number of tubs have passed and thereby prevent the passage of more tubs, and indication means controlled by said counting device.

8. A colliery decking plant comprising a hoisting cage, a full-tub hoist adapted to receive tubs from said cage, an axle counter operated by tubs entering said hoist from said cage, and indication means controlled by said counter.

9. A colliery decking plant comprising a hoisting cage, a full-tub hoist adapted to receive tubs from said cage, a back stop on said full-tub hoist, and indication means controlled by said back stop.

10. A colliery decking plant comprising a hoisting cage, means for locking said cage at the plant deck, a ram for moving cars out of said cage, and means for preventing release of said locking means unless said ram is clear of the cage.

11. A colliery decking plant comprising a hoisting cage, locking means for said cage, a ram on the deck plant for causing movement of tubs in said cage, and means controlled by the position of said ram for releasing said locking means.

12. A colliery decking plant comprising a hoisting cage, means for locking said cage at the plant deck, a ram for moving tubs out of said cage, and means for releasing said locking means only when said ram is clear of the cage.

13. A colliery decking plant comprising a hoisting cage, means for locking said cage at the plant deck, a back stop in said cage capable of operative and inoperative positions, and means for preventing release of said locking means unless said back stop is in the operative position.

14. A colliery decking plant comprising a hoisting cage, a back stop in said cage, and locking means for said cage controlled by the position of said back stop.

15. A colliery decking plant comprising a hoisting cage, means for locking said cage at the plant deck, an axle counter operated by tubs passing out of said cage, and means for preventing release of said locking means unless a given number of tubs have passed out of the cage.

16. A colliery decking plant comprising a hoisting cage, an axle counter in said cage, and locking means for said cage controlled by said axle counter.

17. A colliery decking plant comprising a hoisting cage, means for locking said cage at the plant deck, an axle counter operated by tubs passing out of said cage and arranged to lock after a given number of tubs have passed and thereby prevent the passage of more tubs, and means for preventing release of said locking means unless said counter is locked.

18. A colliery decking plant comprising a hoisting cage, an axle counter operated by tubs passing out of said cage and arranged to lock after a given number of tubs have passed and thereby prevent the passage of more tubs, and locking means for said cage controlled by said counter.

19. A colliery decking plant comprising a hoisting cage, a full-tub hoist adapted to receive tubs from said cage, an axle counter operated by tubs entering said hoist from said cage, and locking means for said cage controlled by said counter.

20. A colliery decking plant comprising a hoisting cage, a full-tub hoist adapted to receive tubs from said cage, a back stop on said full-tub hoist, and locking means for said cage controlled by said back stop.

21. A colliery decking plant comprising a hoisting cage, an axle back stop for said cage, a counter operated by tubs passing out of said cage, a ram on the plant deck for moving tubs in said cage, and locking means for said cage controlled by said back stop, counter and ram.

22. A colliery decking plant comprising a hoisting cage, an axle back stop for said cage, a counter operated by tubs passing out of said cage, a ram on the plant deck for moving tubs in said cage, locking means for said cage, and indication means controlled by said back stop, counter, ram and locking means.

23. A colliery decking plant comprising a hoisting cage, a gate for said cage, and means controlled by said gate for locking said cage at the plant deck.

24. A colliery decking plant comprising a hoisting cage, means for locking said cage at the plant deck, a fluid pressure motor for operating said locking means, a manually operable lever, and means for controlling said motor by said lever and by the position of said cage.

25. A colliery decking plant comprising a hoisting cage, means for locking tubs in said cage, and means for preventing release of said locking means unless the cage is in proper position at the plant deck.

26. A colliery decking plant comprising a hoisting cage, means for locking said cage at the plant deck, a back stop for preventing backward movement of tubs from said cage, locking means for preventing forward movement of tubs from said cage, and means for preventing release of said locking means unless the cage is locked at the plant deck and said back stop is in operative position.

27. A colliery decking plant comprising a hoisting cage, a back stop for the tubs in said cage, and an axle counter for the tubs in said cage controlled by the position of said back stop.

28. A colliery decking plant comprising a hoisting cage, an empty-tub hoist and a full-tub hoist, and means for preventing the passage of tubs out of said cage unless the cage and both hoists are in proper positions at the plant deck.

29. A colliery decking plant comprising a hoisting cage, means for locking tubs in said cage, a manually operable lever for control of said locking means, and means for further controlling said locking means by the position of said cage.

30. A colliery decking plant comprising a hoisting cage, locking means for preventing forward movement of tubs from said cage, a lever having normal and middle positions, a back stop for preventing backward movement of tubs from said cage, a relay, a pick-up circuit for said relay closed when said lever is in normal position, a holding circuit for said relay closed when said back stop is in operative position, and means for releasing said locking means when said relay is closed and said lever is in the middle position.

31. A colliery decking plant comprising a hoisting cage, means for locking said cage at the plant deck, means for locking the tubs in said cage, and means for preventing release of said tub locking means unless the cage locking means is in locking position.

32. A colliery decking plant comprising a hoisting cage, locking means for preventing forward movement of tubs from said cage, an indicator for giving a "ready to ram" signal, and means for preventing said indicator from giving said signal unless said locking means is released.

33. A colliery decking plant comprising a hoisting cage, locking means for preventing forward movement of tubs from said cage, and an indicator controlled by said locking means.

34. A colliery decking plant comprising a hoisting cage, locking means for preventing forward movement of tubs from said cage, and means controlled by said locking means and operative only when the latter is released for giving a "ready to ram" signal.

35. A colliery decking plant comprising a hoisting cage, a ram for moving tubs out of said cage, locking means for preventing forward movement of tubs from said cage, and means for preventing operation of said ram unless said locking means is released.

36. A colliery decking plant comprising a hoisting cage, a stop for preventing backward movement of tubs from said cage, and a ram controlled in part by said stop for moving tubs out of said cage.

37. A colliery decking plant comprising a hoisting cage, locking means for preventing forward movement of tubs from said cage, and a ram controlled by said locking means for moving tubs out of said cage.

38. A colliery decking plant comprising a hoisting cage, a ram for moving tubs out of said cage, and means for preventing operation of said ram unless said cage is in proper position at the plant deck.

39. A colliery decking plant comprising a hoisting cage, means for locking said cage at the plant deck, a ram for moving tubs out of said cage, and means for preventing operation of said ram unless said cage is locked at the plant deck.

40. A colliery decking plant comprising a hoisting cage, an empty-tub hoist for delivering tubs to said cage, and a full-tub hoist for receiving tubs from said cage, a ram for moving empty tubs from said empty-tub hoist to said cage and full tubs from said cage to said full-tub hoist, and means for preventing operation of said ram unless said cage and hoists are all in proper registering positions at the plant deck.

41. A colliery decking plant comprising a hoisting cage, a ram for moving tubs out of said cage and arranged to automatically assume its retracted position, a motor for moving said ram to projected position, a relay, a counting device operated by tubs passing out of said cage and arranged to lock after a given number of tubs have passed, a pick-up circuit for said relay closed only when said counting device is released, a holding circuit for said relay closed when the relay is closed until said ram reaches its fully projected position, and means for supplying energy to said ram motor when said relay is closed.

42. A colliery decking plant comprising a hoisting cage, a ram for moving tubs out of said cage and arranged to automatically assume its retracted position, a motor for moving said ram to projected position, a counting device operating by tubs passing out of said cage and arranged to lock after operation by a given number of tubs, means for releasing said device, and means for supplying energy to said motor when said device has been released and thereafter discontinuing such supply when the ram reaches its fully projected position.

43. A colliery decking plant comprising a hoisting cage, a ram for moving tubs out of said cage, a manually operable lever having normal, middle and reverse positions, a relay, a pick-up circuit for said relay closed only when said lever is in normal position, a back stop for said cage, a holding circuit for said relay closed only when said back stop is in operative position, locking means for said cage operable only in middle-to-reverse positions of said lever, locking means for preventing forward movement of tubs out of said cage, means for releasing said locking means only when said lever is in middle-to-reverse positions and said relay is closed and said cage is in proper position at the plant deck and is locked, lever-locking means for preventing movement of said lever to full reverse position, means for releasing said lever-locking means only when said cage is in proper position at the plant deck and is locked, said relay is closed, and said tub locking means is released, and means for operating said ram only when said lever is in full reverse position.

44. A colliery decking plant comprising a hoisting cage, a ram for moving tubs out of said cage, a manually operable lever having normal, middle and reverse positions, a relay, a pick-up circuit for said relay closed only when said lever is in normal position, a back stop for said cage, a holding circuit for said relay closed only when said back stop is in operative position, locking means for said cage operable only in middle-to- reverse positions of said lever, locking means for preventing forward movement of tubs out of said cage, means for releasing said locking means only when said lever is in middle-to-reverse positions and said relay is closed and said cage is in proper position at the plant deck and is locked, lever-locking means for preventing movement of said lever to full reverse position, means for releasing said lever locking means only when said tub locking means is unlocked, and means operable only when said lever is in full reverse position for actuating said ram.

45. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, locking means for preventing forward movement of tubs out of said cage, and means for controlling said lever lock by said tub locking means.

46. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, means for locking said cage at the plant deck, and means for controlling said lever lock by said cage locking means.

47. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, and means for controlling said lever lock by the position of said cage.

48. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, and means for preventing release of said lever lock unless said cage is in proper position at the plant deck and is locked.

49. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, means for locking said cage at the plant deck, and means for preventing release of said lever lock unless said cage is locked.

50. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, and means for preventing release of said lever lock unless said cage is in proper position at the plant deck.

51. A colliery decking plant comprising a hoisting cage, a ram for moving tubs out of said cage, a manually operable lever having normal and reverse positions, a lock for preventing movement of said lever to full reverse position, means operable only when said lever is in full reverse position for actuating said ram, a back stop for said cage, and means for controlling said lever lock by said back stop.

52. A colliery decking plant comprising a hoisting cage, a manually operable lever having a normal position, a lever lock for preventing movement of said lever to normal position, cage governing means operable only when said lever is in normal position, means for locking said cage, and means for preventing release of said locking means unless said cage is unlocked.

53. A colliery decking plant comprising a hoisting cage, a manually operable lever having a normal position, a lever lock for preventing movement of said lever to normal position, cage governing means operable only when said lever is in normal position, means for locking said cage, and means for controlling said lever lock by said cage locking means.

54. A colliery decking plant comprising a hoisting cage, a manually operable lever having a normal position, a lever lock for preventing movement of said lever to normal position, cage governing means operable only when said lever is in normal position, a counter operated by tubs passing out of said cage, and means for preventing release of said lever lock until said counter has been operated a given number of times.

55. A colliery decking plant comprising a hoisting cage, a manually operable lever having a normal position, a lever lock for preventing movement of said lever to normal position, cage governing means operable only when said lever is in normal position, a counter operated by tubs passing out of said cage, and means for controlling said lever lock by said counter.

56. A colliery decking plant comprising a hoisting cage, a manually operable lever having a normal position, a lever lock for preventing movement of said lever to normal position, cage governing means operable only when said lever is in normal position, a deck for receiving tubs from said cage, a back stop for said deck, and means for controlling said lever lock by said back stop.

57. A colliery decking plant comprising a hoisting cage, a manually operable lever having a normal position, a lever lock for preventing movement of said lever to normal position, cage governing means operable only when said lever is in normal position, a deck for receiving tubs from said cage, a back stop for said deck, and means for preventing release of said lever lock unless said back stop is in stopping position.

58. A colliery decking plant comprising a hoisting cage, a manually operable lever having a normal position, a lever lock for preventing movement of said lever to normal position, cage governing means operable only when said lever is in normal position, locking means for preventing tubs from leaving said cage, and means for preventing release of said lever unless said locking means is locked in operative position.

59. A colliery decking plant comprising a hoisting cage, a manually operable lever having a normal position, a lever lock for preventing movement of said lever to normal position, cage governing means operable only when said lever is in normal position, a counter operated by tubs leaving said cage and arranged to lock automatically and so prevent the passage of further tubs after a given number of tubs have passed, and means for controlling said lever lock by said counter.

60. A colliery decking plant comprising a hoisting cage, a manually operable lever having a normal position, a lever lock for preventing movement of said lever to normal position, cage governing means operable only when said lever is in normal position, a counter operated by tubs leaving said cage and arranged to lock automatically and so prevent the passage of further tubs after a given number of tubs have passed, and means for preventing release of said lever lock unless said counter is locked.

61. A colliery decking plant comprising a hoisting cage, a manually operable lever having a normal position, a lever lock for preventing movement of said lever to normal position, cage governing means operable only when said lever is in normal position, a back stop for said cage, and means for controlling said lever lock by said back stop.

62. A colliery decking plant comprising a hoisting cage, a manually operable lever having a normal position, a lever lock for preventing movement of said lever to normal position, cage governing means operable only when said lever is in normal position, a back stop for said cage, and means for preventing release of said lever lock unless said back stop is in operative position.

63. A colliery decking plant comprising a hoisting cage, a manually operable lever having a normal position, a lever lock for preventing movement of said lever to normal position, cage governing means operable only when said lever is in normal position, a ram for moving tubs out of said cage, and means for controlling said lever lock by the position of said ram.

64. A colliery decking plant comprising a hoisting cage, a manually operable lever having a normal position, a lever lock for preventing movement of said lever to normal position, cage governing means operable only when said lever is in normal position, a ram for moving tubs out of said cage, and means for preventing release of said lever lock unless said ram is clear of the cage.

65. A colliery decking plant comprising a full-tub cage having two decks and normally occupying such position that one of its decks registers with the plant deck, mechanism for shifting said cage to such position that its other deck registers with said plant deck, a counter operated by tubs entering said cage, and means for preventing operation of said shifting means until a given number of tubs has passed said counter.

66. A colliery decking plant comprising a full-tub cage having two decks and normally occupying such position that one of its decks registers with the plant deck, mechanism for shifting said cage to such position that its other deck registers with said plant deck, a counter operated by tubs entering said cage, and means for controlling said shifting mechanism by said counter.

67. A colliery decking plant comprising a full-tub cage having two decks and normally occupying such position that one of its decks registers with the plant deck, mechanism for shifting said cage to such position that its other deck registers with said plant deck, a back stop for said cage, and means for preventing operation of said shifting mechanism unless said stop is in operative position.

68. A colliery decking plant comprising a full-tub cage having two decks and normally occupying such position that one of its decks registers with the plant deck, mechanism for shifting said cage to such position that its other deck registers with said plant deck, a back stop for said cage, and means for controlling said shifting mechanism by the position of said back stop.

69. A colliery decking plant comprising a full-tub cage having two decks and normally occupying such position that one of its decks registers with the plant deck, mechanism for shifting said cage to such position that its other deck registers with said plant deck, a counter operated by tubs leaving said cage, and means for preventing operation of said shifting mechanism until said counter has been operated a given number of times.

70. A colliery decking plant comprising a full-tub cage having two decks and normally occupying such position that one of its decks registers with the plant deck, mechanism for shifting said cage to such position that its other deck registers with said plant deck, a counter operated by tubs leaving said cage, and means for controlling said shifting mechanism by said counter.

71. A colliery decking plant comprising a full-tub cage having two decks and normally occupying such position that one of its decks registers with the plant deck, mechanism for shifting said cage to such position that its other deck registers with said plant deck, and means for controlling said shifting mechanism by the position of said cage.

72. A colliery decking plant comprising a full-tub cage having two decks and normally occupying such position that one of its decks registers with the plant deck, mechanism for shifting said cage to such position that its other deck registers with said plant deck, means for counting the tubs leaving said cage, and means for controlling said shifting mechanism jointly by said counting means and by the position of the cage.

73. A colliery decking plant comprising a full-tub cage having two decks and normally occupying such position that one of its decks registers with the plant deck, mechanism for shifting said cage to such position that its other deck registers with said plant deck, a first contact closed when the cage occupies its normal position and open when the cage is in shifted position, a second contact open when the cage is in normal position and closed when the cage is in shifted position, a third contact closed only after all the tubs accommodated by the first deck have left the cage, a fourth contact closed only after all the tubs accommodated by the second deck have left the cage, and a circuit for the control of said shifting mechanism and having two branches one of which includes the first and third contacts in series and the other of which includes the second and fourth contacts in series.

74. A colliery decking plant comprising a full-tub cage having two decks and normally occupying such position that one of its decks registers with the plant deck, mechanism for shifting said cage to such position that its other deck registers with said plant deck, and means for setting said mechanism into operation after a given number of tubs have left the first deck of the cage and releasing said mechanism after a given number of tubs have left the second deck of the cage.

75. A colliery decking plant comprising a full-tub cage having two decks and normally occupying such position that one of its decks registers with the plant deck, and means operating after a given number of tubs have left said one deck to shift said cage to such position that its other deck registers with the plant deck and to hold it there until a given number of tubs have left the second cage deck.

76. A colliery decking plant comprising a movable empty-tub cage, a back stop for tubs in said cage, and means for controlling the movement of said cage by the position of said stop.

77. A colliery decking plant comprising a movable empty-tub cage, a back stop for tubs in said cage, and means for preventing movement of said cage unless said stop is in operative position.

78. A colliery decking plant comprising a movable empty-tub cage, a counter operated by tubs leaving said cage and adapted to lock after operation by a given number of tubs and thereafter prevent the passage of tubs until released, and means for controlling the movement of said cage by said counter.

79. A colliery decking plant comprising a movable empty-tub cage, a counter operated by tubs leaving said cage and adapted to lock after operation by a given number of tubs and thereafter prevent the passage of tubs until released, and means for preventing movement of said cage unless said counter is locked.

80. A colliery decking plant comprising a movable empty-tub cage, and means set into operation by a tub leaving said cage for preventing movement of the cage until a given number of tubs have left the cage.

81. A colliery decking plant comprising a movable empty-tub cage, a ram for shifting tubs in said cage, and means for preventing movement of said cage unless said ram is clear of the cage.

82. A colliery decking plant comprising a movable empty-tub cage, a ram for shifting tubs in said cage, and means for controlling the movement of said cage by the position of said ram.

In witness whereof I have hereunto set my hand.

F. M. CASTLEMAN.